(12) United States Patent
Tsuruta et al.

(10) Patent No.: US 6,760,642 B2
(45) Date of Patent: Jul. 6, 2004

(54) PARTS PLACEMENT CALCULATION SYSTEM

(75) Inventors: Kazunori Tsuruta, Okazaki (JP);
Masafumi Akiyama, Chiryu (JP);
Isamu Honda, Okazaki (JP); Norifumi Kase, Edogawa-ku (JP)

(73) Assignees: Toyota Jidosha Kabushiki Kaisha, Toyota (JP); CRC Solutions Corp., Tokyo (JP)

( * ) Notice: Subject to any disclaimer, the term of this patent is extended or adjusted under 35 U.S.C. 154(b) by 0 days.

(21) Appl. No.: 10/457,612

(22) Filed: Jun. 10, 2003

(65) Prior Publication Data
US 2003/0233626 A1 Dec. 18, 2003

(30) Foreign Application Priority Data
Jun. 12, 2002 (JP) ........................................ 2002-171773

(51) Int. Cl.[7] ................................................ G06F 7/00
(52) U.S. Cl. ........................................ 700/214; 700/213
(58) Field of Search ................................ 700/213, 214, 700/218; 235/383, 385

(56) References Cited

U.S. PATENT DOCUMENTS 5,430,831 A * 7/1995 Snellen ........................ 700/217

FOREIGN PATENT DOCUMENTS

JP         A 2000-76220          3/2000

* cited by examiner

Primary Examiner—Khoi H. Tran
(74) Attorney, Agent, or Firm—Oliff & Berridge, PLC

(57) ABSTRACT

A parts placement calculation system comprises parts selection means 18 for selecting parts with the highest parts point value, store selection means 20 for selecting a store with the highest store point value, and placement determination means 22 for determining whether or not parts can be placed in a store based on a predetermined constraint condition for placing the parts. When the placement determination means 22 determines that parts cannot be placed in a store, the store is deleted from a list of placement possible stores, and then the store selection means 20 is activated again. When the placement determination means 22 determines that parts can be placed in a store, a parts area for placing the target parts are determined within the store. Then, after the parts are deleted from the list of parts to be placed, the parts selection means 18 is reactivated.

32 Claims, 10 Drawing Sheets

··· PARTS AREA

··· STORE

··· VACANT SPACE WHERE NO PARTS ARE PLACED

··· OBSTACLE

··· PASSAGE SEPARATION

··· PASSAGE

··· LIFT PASSAGE DIRECTION

PARTS PLACEMENT CALCULATION SYSTEM

BACKGROUND OF THE INVENTION

1. Field of the Invention

The present invention relates to placement of component parts in a factory or the like, and more particularly to parts placement calculation for automatically calculating locations where such parts are to be placed.

2. Description of Related Art

In factories or the like, component parts which have been processed in one production process are sometimes temporarily stored in a parts storage before being used in a subsequent process. For example, in the case of lot production using a press or the like in automobile manufacturing factories, it is necessary to temporarily store relatively large parts such as body panels in a limited space. In addition, numerous types of other parts must also be stored. Therefore, appropriate parts placement, being the determination of storage locations for components and other parts, should be performed.

Conventionally, in order to determine parts placing locations, a person such as responsible for placement of parts designs the placement design by drawing the parts placing location of each parts on a CAD system, taking consideration of the parts placing area in the parts storage or the like based on his/her own experience.

In such conventional placement design performed by a parts manager on a CAD system as described above, calculations are complicated and can be enormous when a great number of parts are to be placed in a limited space. Thus, the conventional placement design requires a very great calculation time, and, due to the complexity of the calculations, is simply incapable of giving sufficient consideration to the physical distribution efficiency associated with parts transportation.

The present invention advantageously provides a parts placement calculation system, a parts placement calculation method, a parts placement calculation program, a recording medium which records a parts placement calculation program, and a parts placement support system, capable of designing parts placement taking the physical distribution efficiency and the area efficiency into consideration, even when a wide variety of parts must be located in a limited space.

SUMMARY OF THE INVENTION

The present invention was conceived in view of the aforementioned problems of the related art and provides a parts placement calculation system for distributing and placing parts of a plurality of types in a plurality of stores within a parts storage based on a parts point value for each type of parts and a store point value for each store with regard to each type of parts, the system comprising parts selection means for selecting a parts with the highest parts point value from a list of parts to be placed, store selection means for selecting a store with the highest store point value from a list of placement possible stores regarding the selected parts, and placement determination means for determining whether or not the selected parts can be placed in the selected store, based on a predetermined constraint condition for placing the selected parts in the selected store, wherein, when the placement determination means determines that the selected parts cannot be placed in the selected store, the selected store is deleted from the list of placement possible stores and then the store selection means is activated again, and, when the placement determination means determines that the selected parts can be placed in the selected store, a parts area for placing the selected parts in the store is determined, and the selected parts is deleted from the list of parts to be placed, and then the parts selection means is activated again.

With the above configuration, meaning of parts includes types of parts and quantity of parts which are placed. Parts placement calculation can be automatically performed by the parts placement calculation system. Therefore, compared to conventional parts placement calculation which typically requires a calculation time on the order of two to three weeks, the calculation time required for the present system is significantly reduced to several tens of minutes, which drastically reduces the possibility of calculation errors and placement impossibility. Further, conventionally, when a large number of types of parts which are relatively large are to be located within a limited space, placement is actually performed taking only the placing area into consideration. Even in such a situation, the present system allows parts placement which takes not only the area efficiency but also the parts transportation efficiency into consideration.

Preferably, the constraint condition in the placement determination means is that selected parts do not overlap a parts area which is already positioned and an obstacle, and that an area sufficient for placing selected parts are provided.

Further, in order to achieve the above advantage, the present invention provides a parts placement calculation system for distributing and placing parts of a plurality of types in a plurality of stores within a parts storage based on a parts point value for each type of parts and a store point value for each store with regard to each type of parts, the system comprising placement possible store set extraction means for removing a store in which placement is not possible based on a predetermined constraint condition for placing each parts from a store list associated with each parts, parts selection means for selecting a parts with the highest parts point value from a list of parts to be placed, and store selection means for selecting a store with the highest store point value from a list of placement possible stores regarding the selected parts, wherein, after the placement possible store set extraction means is executed, parts are selected by the parts selection means, a store for the selected parts is selected by the store selection means, and a parts area for placing the selected parts is determined in the selected store, and then after deleting the selected parts from the list of parts to be placed, the placement possible store set extraction means is executed again.

With the above configuration, it is possible to consider a constraint condition regarding a plurality of parts, including a constraint condition that a plurality of parts are placed in the same store, for example. Furthermore, placement calculation time can be further reduced because it is possible to remove a store in which placement is not possible from a store list prior to activation of the store selection means.

Preferably, the constraint condition in the placement possible store set extraction means is that a selected parts do not overlap a parts area which is already positioned or an obstacle, and that an area sufficient for placing a selected parts are provided, and also that when it is instructed to place a plurality of arbitrary parts in a same store, all of the plurality of arbitrary parts have an identical store list.

Preferably, the parts point value is obtained by adding a priority and an area difference of corresponding parts with a predetermined weighting coefficient multiplied therewith. The priority is a function of the frequency of carrying in and out the corresponding parts and the area difference is a function of a difference between the largest value and the smallest value of placing areas in stores for placing the corresponding parts, the placing areas being different for different stores due to a predetermined placing condition. The store point value is obtained by adding a transportation distance point value and an area point value of a corresponding store with a predetermined weighting coefficient multiplied therewith. The transportation distance point value is a function of a transportation distance for carrying parts in and out of the corresponding store and the area point value is a function of a placing area which depends on a predetermined placing condition when placing parts in the corresponding store.

With the above configuration, it is further possible to perform placement in consideration of both the physical distribution efficiency and the area efficiency.

Preferably, the placing condition regarding the parts point value and the store point value is that only pallets containing the same types of parts are placed in the same pallet placement line which is in the lift traveling direction in the store, that pallet placement lines for the same types of parts are located adjacent to each other, and that pallets for the same type of parts are placed in the same store.

With the above configuration, because parts which are the same as the parts placed in the further area of the store seen from the passage is placed closer to the passage, parts can be easily transported using a lift. Further, because the same parts are placed collectively in the same store, parts transportation and confirmation is made more convenient.

Preferably, the above parts placement calculation system further comprises external input means for selecting a weighting coefficient of the parts point value and the store point value from a plurality of predetermined values and inputting the selected value.

Preferably, the above parts placement calculation system further comprises dividing means for dividing an interior of the parts storage into a plurality of rectangular stores, passages extending in parallel to outer peripheries of each store, and obstacles. Parts of the same type are contained in the same pallet, and each pallet is transported by a lift, which, when traveling along the passages and reaches a location near the store, turns substantially the vertical direction with regard to a passage traveling direction and advances substantially straight to enter the store for carrying each pallet in and out. The system further comprises coordinate system generating means for generating a plan coordinate system which is converted such that, assuming a lift traveling direction facing the passage within a store as a lift passage direction, a plurality of stores are rotated so that the lift passage directions thereof are oriented in a predetermined direction.

With the above configuration, calculation time can be further reduced by use of a plan coordinate system which obviates the need for complicated placement calculations.

Preferably, parts to be placed are divided into a plurality of groups, from which a certain group is selected, and after determining a parts area for placing all the parts included in the selected group, the determined parts areas are fixed, and then another group of the remaining groups is selected and parts areas for placing all the parts included in the selected group are determined. Then, the above procedure is repeated.

With the above configuration, because the parts placement is carried out step by step, situational changes during the parts placement process can be easily accommodated, and desined parts can be preferentially placed.

Preferably, the above parts placement calculation system further comprises segment positioning means for, after determination of a parts area, positioning a segment having a size corresponding to the pallet size with an extra space and provided corresponding to each pallet within the parts area. The segment positioning means selects an arbitrary segment from a list of segments to be positioned within the parts area, and positions the selected segment at the furthest point, seen from the passages, of a positioning possible portion except a segment already positioned and the obstacle, in an arbitrary single line in which a segment can be positioned, and the selected segment is deleted from the list of segments, and the above procedure is repeated after selecting another arbitrary segment from the list of segments.

With the above configuration, by setting the desired size segment, it is possible to secure a desired gap between pallets to be placed.

(2) Further, in order to achieve the above advantage, the present invention provides a parts placement calculation method for distributing and placing parts of a plurality of types in a plurality of stores within a parts storage based on a parts point value set for each type of parts and a store point value set for each store with regard to each type of parts, the method comprising a step in which a parts selection means selects parts with the highest parts point value from a list of parts to be placed, a step in which a store selection means selects a store with the highest store point value from a list of placement possible stores regarding the selected parts, and a step in which a placement determination means determines whether or not the selected parts can be placed in the selected store, based on a predetermined constraint condition for placing the selected parts in the selected store. In the above method, when the placement determination means determines that the selected parts cannot be placed in the selected store, the selected store is deleted from the list of placement possible stores and then the store selection means is again activated, and, when the placement determination means determines that the selected parts can be placed in the selected store, a parts area for placing the selected parts in the store is determined, the selected parts are deleted from the list of parts to be placed, and then the parts selection means is activated again.

With the above configuration, by causing a parts placement calculation system to perform the above method, it is possible to significantly reduce the calculation time to several tens of minutes, compared to conventional parts placement calculations which require a large calculation time on the order of two to three weeks, and it is also possible to reduce drastically the possibility of calculation errors and placement fault. Further, conventionally, when a large number parts types of a relatively large physical size are to be placed in a limited placing space, placement is actually performed taking only the placing area into consideration. Even in such a situation, present method allows parts placement which considers parts transportation efficiency as well as area efficiency.

Preferably, the constraint condition in the placement determination means is that selected parts do not overlap a parts area which is already positioned or an obstacle, and that an area sufficient for placing a selected parts are provided.

Further, in order to achieve the above advantage, the present invention provides a parts placement calculation method for distributing and placing parts of a plurality of types in a plurality of stores within a parts storage based on a parts point value set for each type of parts and a store point value set for each store with regard to each type of parts, the method comprising a step in which a placement possible store set extraction means removes a store in which placement is not possible based on a predetermined constraint condition for placing each parts from a store list associated with each parts, a step in which a parts selection means selects parts with the highest parts point value from a list of parts to be placed, and a step in which a store selection means selects a store with the highest store point value from a list of placement possible stores regarding the selected parts. In the above step, after the placement possible store set extraction means is executed, parts is selected by the parts selection means, a store for the selected parts is selected by the store selection means, and a parts area for placing the selected parts is determined in the selected store, and then after deleting the selected parts from the list of parts to be placed, the placement possible store set extraction means is executed again.

With the above configuration, it is possible to consider a constraint condition regarding a plurality of parts, including a constraint condition that a plurality of parts are placed in the same store, for example. Further, because it is possible to remove a store in which placement is not possible from a store list prior to activation of the store selection means, the placement calculation time is further reduced.

Preferably, the constraint condition in the placement possible store set extraction means is that selected parts do not overlap a parts area which is already positioned or an obstacle, and that an area sufficient for placing selected parts are provided, and that when instructed to place a plurality of arbitrary parts in a same store, all of the plurality of arbitrary parts must have an identical store list.

Preferably, the parts point value is obtained by adding a priority and an area difference of corresponding parts with a predetermined weighting coefficient multiplied therewith. The priority is a function of the frequency of carrying the corresponding parts in and out, and the area difference is a function of a difference between the largest value and the smallest value of placing areas in stores for placing the corresponding parts, the placing areas being different for different stores due to a predetermined placing condition. The store point value is obtained by adding a transportation distance point value and an area point value of a corresponding store with a predetermined weighting coefficient multiplied therewith, and the transportation distance point value is a function of a transportation distance for carrying parts in and out of the corresponding store and the area point value is a function of a placing area which depends on a predetermined placing condition when placing parts in the corresponding store.

With the above configuration, it is further possible to perform placement while taking into consideration both the physical distribution efficiency and the area efficiency.

Preferably, the placing condition regarding the parts point value and the store point value is that only pallets containing the same types of parts are placed in the same pallet placement line which is in the lift traveling direction in the store, that pallet placement lines for the same type of parts are located adjacent to each other, and that pallets for the same type of parts are placed in the same store.

With the above configuration, because parts which are the same as the parts placed in the further area seen from the passage is placed closer to the passage, parts can be easily transported using a lift. Further, because the same parts are placed collectively in the same store, convenience of parts transportation and confirmation can be enhanced.

Preferably, the above parts placement calculation method further comprises a step in which external input means selects a weighting coefficient of the parts point value and of the store point value from a plurality of predetermined values and inputs the selected value.

Preferably, the above parts placement calculation method further comprises a step in which dividing means divides an interior of the parts storage into a plurality of rectangular stores, passages extending in parallel to outer peripheries of each store, and obstacles, and parts of the same type are contained in the same pallet, and each pallet is transported by a lift, which, when traveling along the passages and reaches a location near the store, turns substantially the vertical direction with regard to a passage traveling direction and advances substantially straight to enter the store for transporting each pallet in and out. The method further comprises a step in which coordinate system generating means generates a plan coordinate system which is converted such that, assuming a lift traveling direction facing the passage within a store as a lift passage direction, a plurality of stores are rotated so that the lift passage directions thereof are oriented in a predetermined direction.

With the above configuration, because complication of a placement calculation can be prevented by use of a plan coordinate system, the calculation time can be further reduced.

Preferably, parts to be placed are divided into a plurality of groups, from which a certain group is selected, and after determining a parts area for placing all the parts included in the selected group, the determined parts areas are fixed, and then another group of the remaining groups is selected and a parts area for placing all the parts included in the selected group are determined. Then, the above procedure is repeated.

With the above configuration, because the parts placement is carried out step by step, changes in the situation in the middle of the parts placement can be easily accommodated such that desired parts are preferentially placed.

Preferably, the above parts placement calculation method further comprises a step in which a segment positioning means, after determination of a parts area, positions a segment having a size corresponding to the pallet size with an extra space and provided corresponding to each pallet, within the parts area. In the above method, the segment positioning means selects an arbitrary segment from a list of segments to be positioned within the parts area, and positions the selected segment at the furthest point, seen from the passages, of a positioning possible portion except a segment already positioned and the obstacle, in arbitrary one line in which a segment can be positioned, and the selected segment is deleted from the list of segments and the above procedure is repeated after selecting another arbitrary segment from the list of segments.

By setting the desired size segment with the above configuration, it is possible to secure a desired gap between pallets to be placed.

(3) Still further, in order to achieve the above advantage, the present invention provides a parts placement calculation program which causes a computer to carry out a parts placement calculation for distributing and placing parts of a plurality of types in a plurality of stores within a parts storage based on a parts point value set for each type of parts and a store point value set for each store with regard to each type of parts, the parts placement calculation program causing the computer to function as parts selection means for selecting parts with the highest parts point value from a list of parts to be placed, store selection means for selecting a store with the highest store point value from a list of placement possible stores regarding the selected parts, and placement determination means for determining whether or not the selected parts can be placed in the selected store, based on a predetermined constraint condition for placing the selected parts in the selected store, wherein, when the placement determination means determines that the selected parts cannot be placed in the selected store, the selected store is deleted from the list of placement possible stores and then the store selection means is activated again, and, when the placement determination means determines that the selected parts can be placed in the selected store, a parts area for placing the selected parts in the store is determined, the selected parts are deleted from the list of parts to be placed, and the parts selection means is the reactivated.

With the above configuration, a parts placement calculation can be automated and performed by a computer. This makes it possible to significantly reduce the calculation time, down to the order of several tens of minutes, compared to the calculation time on the order of two to three weeks required by conventional methods. Calculation error and associated placement impossibility are meanwhile reduced. Further, while conventionally, when a large number of types of parts having a relatively large physical size are to be placed in a limited placing space, placement is actually performed taking only the placing area into consideration, the present system allows parts placement which takes not only the area efficiency but also the parts transportation efficiency into consideration.

Preferably, the constraint condition in the placement determination means is that selected parts do not overlap a parts area which is already positioned or an obstacle, and that an area sufficient for placing a selected parts are provided.

Further, in order to achieve the above advantage, the present invention provides a parts placement calculation program which causes a computer to carry out a parts placement calculation for distributing and placing parts of a plurality of types in a plurality of stores within a parts storage based on a parts point value set for each type of parts and a store point value set for each store with regard to each type of parts, the parts placement calculation program causing the computer to function as placement possible store set extraction means for removing a store in which placement is not possible based on a predetermined constraint condition for placing each parts from a store list associated with each parts, parts selection means for selecting parts with the highest parts point value from a list of parts to be placed, and store selection means for selecting a store with the highest store point value from a list of placement possible stores regarding the selected parts, wherein, after the placement possible store set extraction means is executed, parts are selected by the parts selection means, a store for the selected parts is selected by the store selection means, and a parts area for placing the selected parts is determined in the selected store, and then after deleting the selected parts from the list of parts to be placed, the placement possible store set extraction means is again executed.

With the above configuration, it is possible to consider a constraint condition regarding a plurality of parts, including a constraint condition that a plurality of parts must be placed in the same store, for example. Further, because it is possible to remove a store in which placement is not possible from a store list prior to activation of the store selection means, the placement calculation time can be further reduced.

Preferably, the constraint condition in the placement possible store set extraction means is that selected parts do not overlap a parts area which is already positioned and an obstacle, and that an area sufficient for placing selected parts are provided, and also that when it is instructed to place a plurality of arbitrary parts in a single store, all of the plurality of arbitrary parts must have an identical store list.

Preferably, the parts point value is obtained by adding a priority and an area difference of corresponding parts with a predetermined weighting coefficient multiplied therewith, and the priority is a function of the frequency at which the corresponding parts is transported in and out, and the area difference is a function of a difference between the largest value and the smallest value of placing areas in stores for placing the corresponding parts, the placing areas being different for different stores due to a predetermined placing condition. The store point value is obtained by adding a transportation distance point value and an area point value of a corresponding store with a predetermined weighting coefficient multiplied therewith, and the transportation distance point value is a function of a transportation distance for carrying parts in and out of the corresponding store and the area point value is a function of a placing area which depends on a predetermined placing condition when placing parts in the corresponding store.

With the above configuration, it is further possible to perform placement which takes into consideration both the physical distribution efficiency and the area efficiency.

Preferably, the placing condition regarding the parts point value and the store point value is that only pallets containing the same types of parts are placed in the same pallet placement line which is in the lift traveling direction in the store, that pallet placement lines for the same types of parts are located adjacent to each other, and that pallets for the same type of parts are placed in the same store.

With the above configuration, because parts which is the same as the parts placed in the further area seen from the passage is placed closer to the passage, transportation in and out of parts using a lift can be performed easily. Further, because the same parts are placed collectively in the same store, parts transportation and confirmation can be performed conveniently.

Preferably, the above parts placement calculation program further causes a computer to function as external input means for selecting a weighting coefficient of the parts point value and the store point value from a plurality of predetermined values and inputs the selected value.

Preferably, the above parts placement calculation program further causes a computer to function as dividing means for dividing an interior of the parts storage into a plurality of rectangular stores, passages extending in parallel to outer peripheries of each store, and an obstacle. Parts of the same type are contained in the same pallet, and each pallet is transported by a lift, which, when traveling along the passages and reaches near the store, turns to a substantially vertical direction with regard to a passage traveling direction and advances substantially straight to enter the store for carrying each pallet in and out. The above program further causes a computer to function as coordinate system generating means for generating a plan coordinate system which is converted such that, assuming a lift traveling direction facing the passage within a store as a lift passage direction, a plurality of stores are rotated so that the lift passage directions thereof are oriented in a predetermined direction.

With the above configuration, because complication of a placement calculation can be prevented through use of a plan coordinate system, the calculation time can be further reduced.

Preferably, parts to be placed are divided into a plurality of groups, from which a certain group is selected, and, after a parts area for placing all the parts included in the selected group is determined, the determined parts areas are fixed, and then another group of the remaining groups is selected and a parts area for placing all the parts included in the selected group is determined. Then, the above procedure is repeated as appropriate.

With the above configuration, because the parts placement is carried out step by step, changes in the situation can be readily accommodated, even in the middle of the parts placement process, such that desired parts can be preferentially placed.

Preferably, the above parts placement calculation program further causes a computer to function as segment positioning means for, after determination of a parts area, positioning a segment having a size corresponding to the pallet size with an extra space and provided corresponding to each pallet, within the parts area, wherein the segment positioning means selects an arbitrary segment from a list of segments to be positioned within the parts area, and positions the selected segment at the point furthest from the passages of a positioning possible portion, except where a segment or obstacle is already positioned, along an arbitrary one line in which a segment can be positioned, and the selected segment is deleted from the list of segments and the above procedure is repeated after selecting another arbitrary segment from the list of segments.

With the above configuration, by setting the desired size segment, it is possible to secure a desired gap between pallets to be placed.

(4) Further, in order to achieve the above advantage, a parts placement calculation program according to the present invention may be recorded on a computer readable recording medium. When this recording medium is read by a computer, it is possible to cause the computer to perform a parts placement calculation for placing parts. A recording medium may be, for example, a disc medium such as a CD-ROM and DVD-ROM.

(5) Still further, the present invention provides a parts placement support system including the above-described parts placement calculation system comprising an integrated database for managing data which is necessary for parts placement, and a layout changing system for retrieving layout information from the integrated database and outputting the layout information after the layout information has been corrected, when the layout within a parts storage is changed, wherein the parts placement calculation system performs a parts placement calculation based on the data managed by the integrated database.

BRIEF DESCRIPTION OF THE DRAWINGS

These and other advantages of the invention will be explained in the description below, in connection with the accompanying drawings, in which.

DETAILED DESCRIPTION OF THE PREFERRED EMBODIMENTS

Preferred embodiments of the present invention will be described with reference to the drawings.

Figure 1:
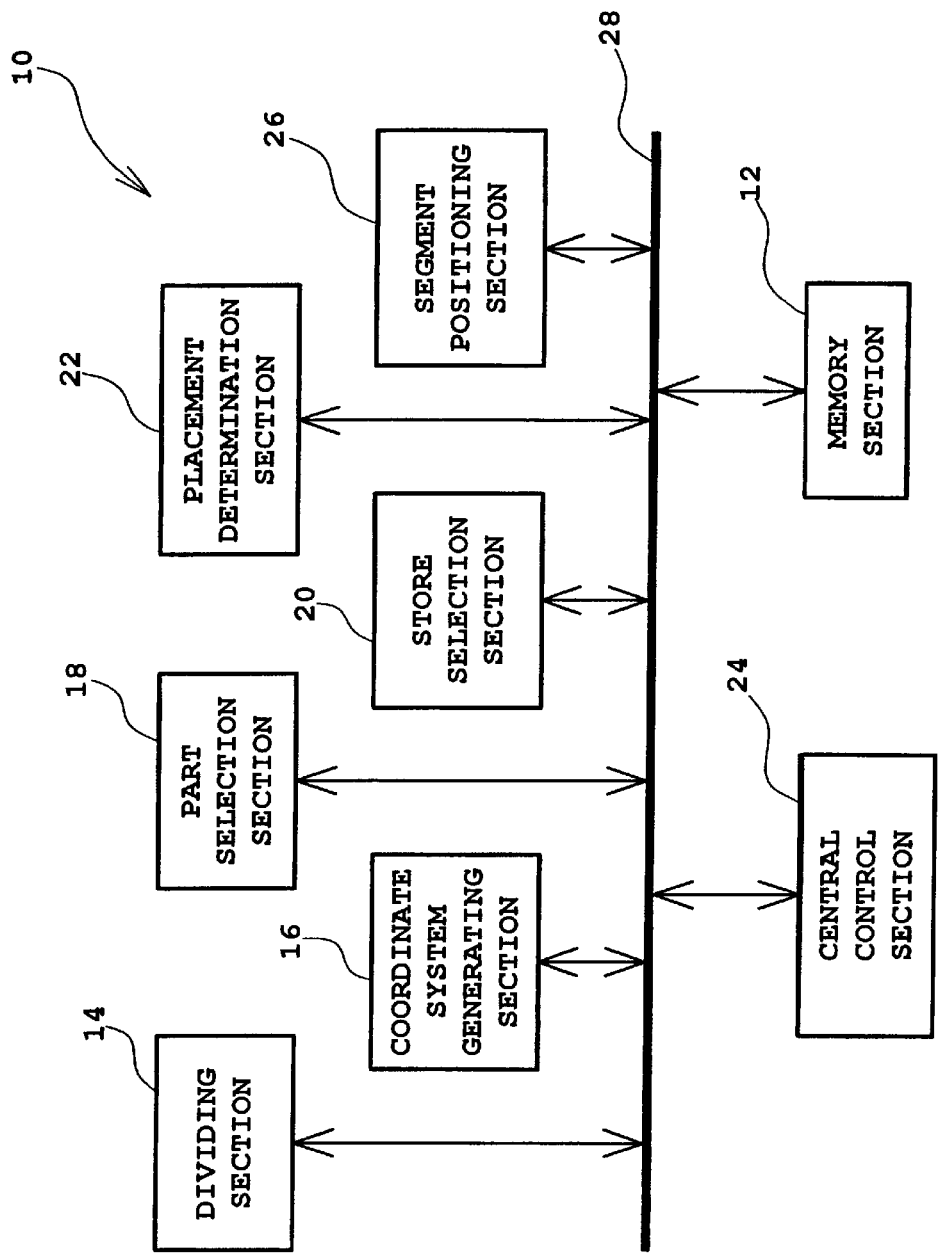
FIG. 1 is a block diagram of a parts placement calculation system according to the present invention.

FIG. 1 is a block diagram showing the overall configuration of a preferred embodiment of a parts placement calculation system in accordance with the present invention. In the parts placement calculation system of the present invention, in order to distribute and place parts of a plurality of types in a plurality of stores within a parts storage, a parts point value which is set for each type of parts, a store point value which is set for each store with regard to each type of parts, or the like are stored in a memory section 12, so that parts are distributed and placed based on these points. The parts point value and the store point value will be further described below.

A dividing section 14 divides the interior of the parts storage into a plurality of rectangular stores, passages extending parallel to the outer peripheries of each store, and obstacles. A coordinate system generating section 16, based on a lift passage direction which is a moving direction of a lift toward the passage in each store, generates a plan coordinate system in which each store is rotated such that the lift passage direction is oriented in a predetermined direction. A parts selection section 18 selects the parts with the highest parts point value from a list of parts to be placed. A store selection section 20 selects the store with the highest store point value from a list of stores in which parts placement is possible (also referred to herein as "placement possible stores") with regard to the parts selected by the parts selection section 18. A placement determination section 22 determines whether or not the selected parts can be placed in the store selected by the store selection section 20 based on a predetermined constraint condition for placing the target parts.

When the placement determination section 22 determines that the selected parts cannot be placed in the store, a central control section 24 deletes the store from a list of placement possible stores and then activates the store selection section 20 again. When, on the other hand, the placement determination section 22 determines that the selected parts can be placed in the store, the central control section 24 positions a parts area in the store for placing the target parts, deletes the parts from the list of parts, and then activates the parts selection section 18 again. After positioning of the parts area, the central control section 24 executes a segment positioning section 26, which selects an arbitrary segment from a list of segments to be positioned within the parts area and positions the selected segment at the furthest point of the segment positioning possible region in the parts area seen from the passage in a segment positioning possible line other than the area of segments already positioned and obstacles. The selected segment is then removed from the list of segments and the above procedure is repeated after selecting an arbitrary segment from the list. The central control section 24 thus controls each of the above sections to repeat the parts placing procedure as described above, so that all the desired parts can be distributed and placed. The central control section 24 is further capable of controlling external inputs and outputs not shown.

Referring to FIG. 1, each section is connected to all other sections through a communication medium 28. Each section shown in FIG. 1 may be implemented in the form of hardware or in the form of software within a computer. Further, some parts or the whole of each section may be an independent system. The system 10 may be constituted by a combination of hardware and software. The operation of the parts placement calculation system 10 according to the present invention will be described.

Figure 2:
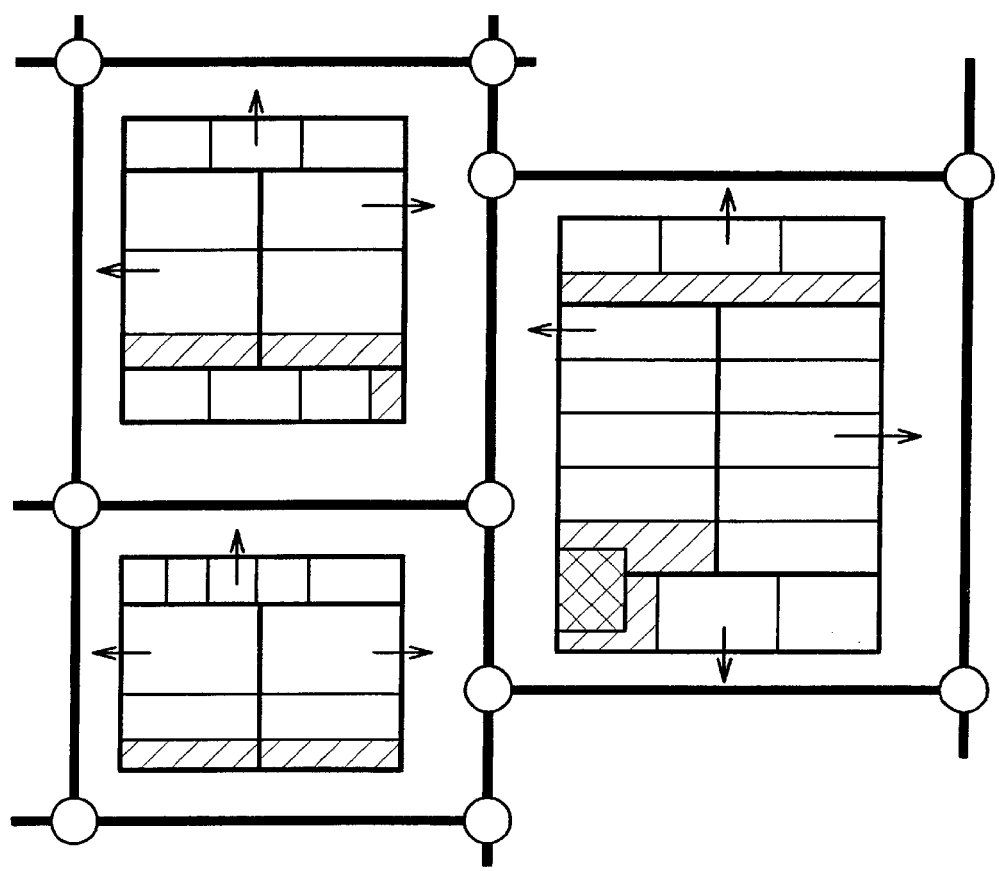
FIG. 2 is a schematic view of a parts storage in which parts placement is performed.
Figure 2:
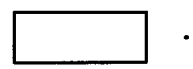
Figure 2:
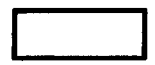
Figure 2:
Figure 2:
Figure 2:
Figure 2:
Figure 2:

FIG. 2 is a schematic view of a parts storage in which parts placement is performed according to the present invention. Parts of a plurality of types which are produced in a factory are stored in containers called pallets, with each pallet containing parts of the same type. Stacks are formed of a predetermined number of pallets. In the present example, each stack contains pallets loaded with the same type of parts. The parts contained in the pallets are carried in the parts storage from the production station or are carried out of the parts storage to the subsequent process station, using a lift.

As shown in FIG. 2, the parts storage is divided into a plurality of stores, and a group of stores form a store group. In FIG. 2, three store groups are segmented by passages. The parts storage further includes an obstacle as an area where no parts can be placed. In FIG. 2, parts areas are also shown. More specifically, the parts storage is divided into passages, stores and obstacles, as described above, and the region on the store in which parts are to be placed is referred to as a parts area.

When a lift loaded with pallets at the production station travels through the passages and reaches the store in which the parts are to be placed, the lift turns to the vertical direction relative to the traveling direction and enters the store so as to place the pallets. At this time, the lift only advances directly within the store. In other words, the moving direction of the lift is limited to the vertical direction with regard to the traveling direction on the passage, so that the pallets are placed in a line along this limited moving direction. The direction of the lift movement within the store, namely the line of placing the pallets is referred to as a placement line, and the traveling direction of the lift toward the passage is referred to as a lift passage direction.

Further, a segment is defined as a location on the parts area at which a pallet is to be placed. The size of a segment corresponds to the pallet size with an extra space. This enables the pallets to be placed on the parts area, in consideration of not only the pallet size but also the extra space needed for transportation and placement of the pallet by means of the lift. The number of segments required for placing a particular type of parts corresponds, for example, to the number of segments required for placing parts which are produced as one lot. In this case, because the parts which have been placed are used in the following process before parts in the next lot are produced, it is sufficient to prepare a space which allows placement of parts corresponding to one production lot.

Here, the parts point value is defined. The parts point value is obtained from a point of priority and a point of area difference determined for each type of parts, with a predetermined weight being added to these points. The priority is determined based on the frequency of transportation of the pallet loaded with the parts in the store and the frequency of removal of the parts from the store, in consideration of efficiency of physical distribution. The area difference allows for the fact that the placing areas differ for different stores due to placing conditions. The placing condition is, for example, that in a placement line where pallets loaded with a certain type of parts are placed, a pallet loaded with a different type of parts should not be placed even when there is a vacant space in the placement line. Namely, both the pallet placed at the furthest points in a certain placement line from the passage and the pallet placed closer to the passage in the same placement line are loaded with the same type of parts, so that time and labor needed for taking out the parts located at the furthest points from the passage can be eliminated. Further, by setting a placing condition such that the pallets containing the same type of parts are placed in adjacent placement lines, it is possible to locate the same types of parts collectively in one place, which is desirable in terms of parts transportation and confirmation. In this manner, due to the constraints of the placing condition, placing areas differ for different stores, even for stores of the same type of parts. Thus, for a particular parts type, the placing area is calculated for all the stores under the constraint of the placing condition, and a difference between the maximum placing area and the minimum placing area is computed as an area difference of the parts. Then, a high parts point value is assigned to parts with a large area difference. In parts placement, such parts with a high parts point value is preferentially placed, so that the area efficiency can be considered.

Further, the store point value is defined. The store point value is obtained from a transportation distance point value and an area point value determined for each store with regard to each parts, with a predetermined weight being added to these point values.

The transportation distance point value corresponds to a transportation distance of a lift from the production station of parts to a store whose store point value is to be calculated. A higher point is assigned to a store with a smaller transportation distance. The transportation distance is associated with the physical distribution efficiency, and parts is preferentially placed in a store having a smaller transportation distance, in other words, in a store with a higher point value. With regard to the area point value, the placing areas are different for different stores due to the placing condition as described above, and a higher area point value is assigned to a store with a smaller placing area. Namely, the smaller the placing area, the higher the area point value, and thus the higher the store point value. Placing parts in a store with a higher store point value enables setting of criteria with area efficiency used as one consideration.

Figure 3:
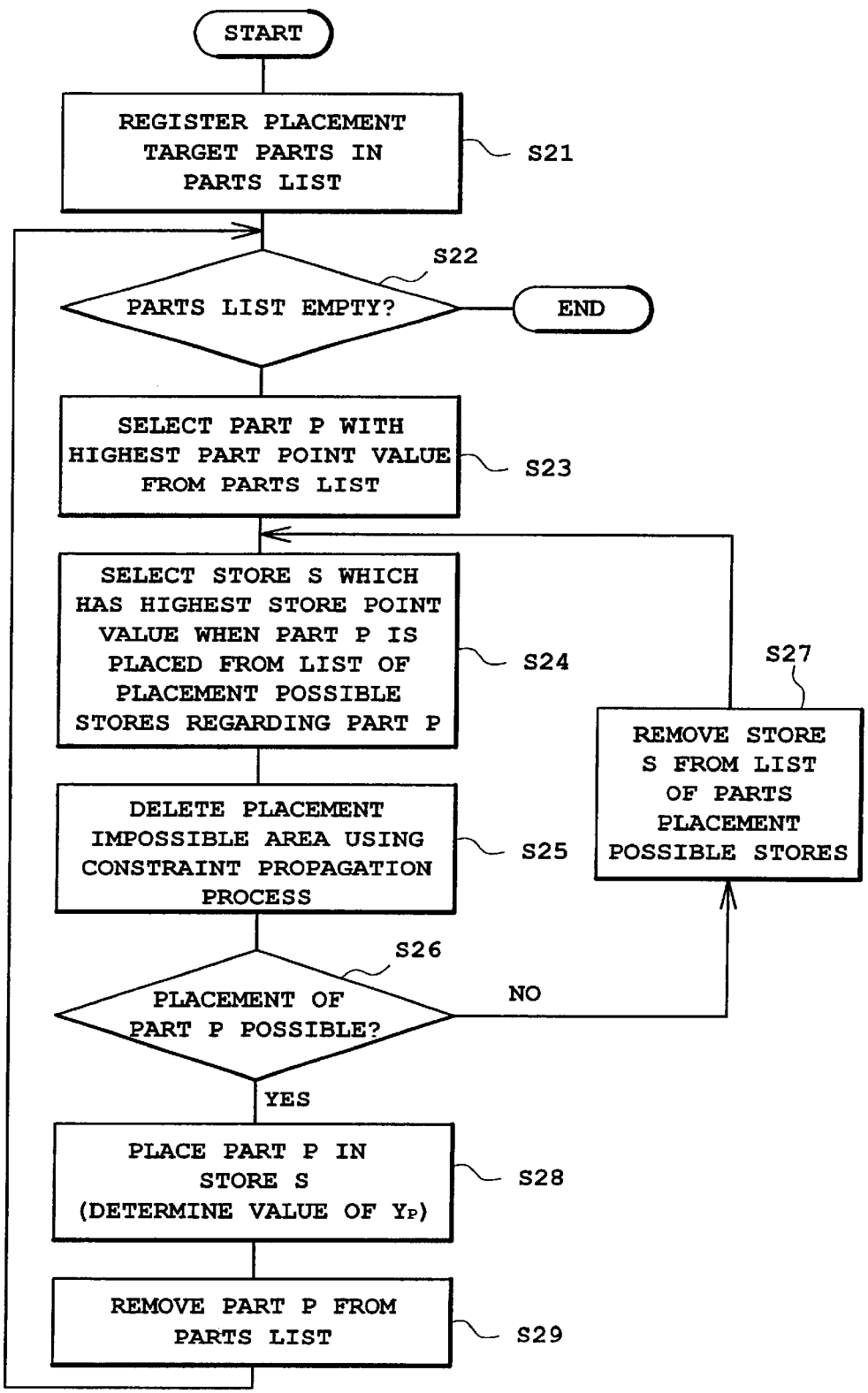
FIG. 3 is a flowchart showing a parts placing procedure.

FIG. 3 is a flowchart showing a parts placing procedure according to the parts placement calculation system of the present invention. The parts placing procedure will be described based on the flowchart.

At step S21, for parts to be placed, the number of segments required for the parts placement, and the parts point value and the store point value for each parts are calculated and registered as a parts list.

At step S22, it is confirmed whether or not parts are registered in the parts list. When no parts are registered in the parts list, it is determined that all the parts have been placed and terminates the parts placement. When parts are in the list, the process proceeds to step S23.

At step S23, parts P with the highest parts point value is selected from the parts list.

At step S24, among the list of stores which allow placement of the parts P (also referred to as "placement possible stores for the parts P), a store S which has the highest store point value when the parts P is placed is selected.

At step S25, an area where no parts can be placed (hereinafter referred to as placement impossible area) is deleted from the store S based on a predetermined constraint condition. The predetermined constraint condition includes, for example, that a parts area to be positioned does not overlap the parts area already positioned or the obstacles. When a constraint logic programming, for example, is used as a method for deleting the placement impossible area based on a constraint condition to execute a constraint propagation process, it is possible to significantly reduce time for searching a solution. Constraint logic programming is one artificial intelligence technology, and has been studied and applied to industry mainly as a methodology for solving scheduling issues such as work plans and production plans.

At step S26, it is confirmed whether or not there remains in the store S an area as required for placement of the selected parts P after the placement impossible area has been removed at step S25. When it is determined that the store S does not include an area fulfilling the requirements for placement, in other words, it is when it is determined that no suitable placing area exists, the process proceeds to step S27 where the store S is deleted from the list of placement possible stores for the parts P. The process then returns back to step S24. When it is determined that the store S includes a placing area for the parts P at step S26, the process proceeds to step S28.

At step S28, the parts P is placed in the store S. At this time, the parts P is placed in the placement possible area within the store S in which the parts transportation distance will be the shortest. The procedure for placing parts in the selected store S will be further described below.

At step S29, the parts P are removed from the parts list, and the process returns to step S22.

By repeating the above steps until no more parts to be placed remain, all the target parts are placed in the stores.

Figure 4A:
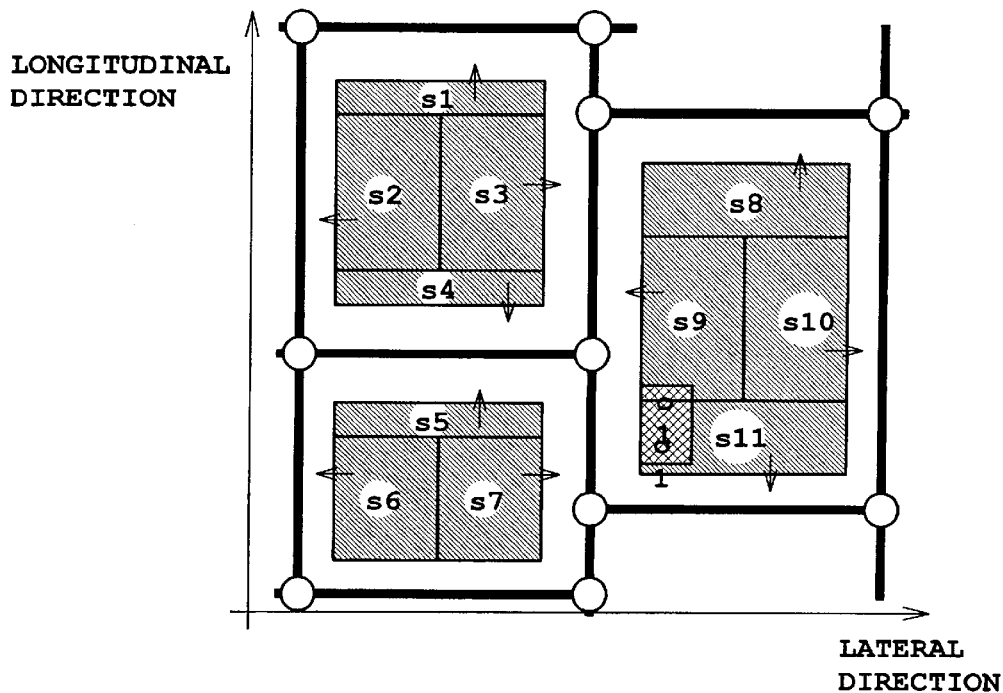
FIGS. 4A,4B is a view showing an example of coordinate conversion from a representative coordinate system to a plan coordinate system.
Figure 4B:
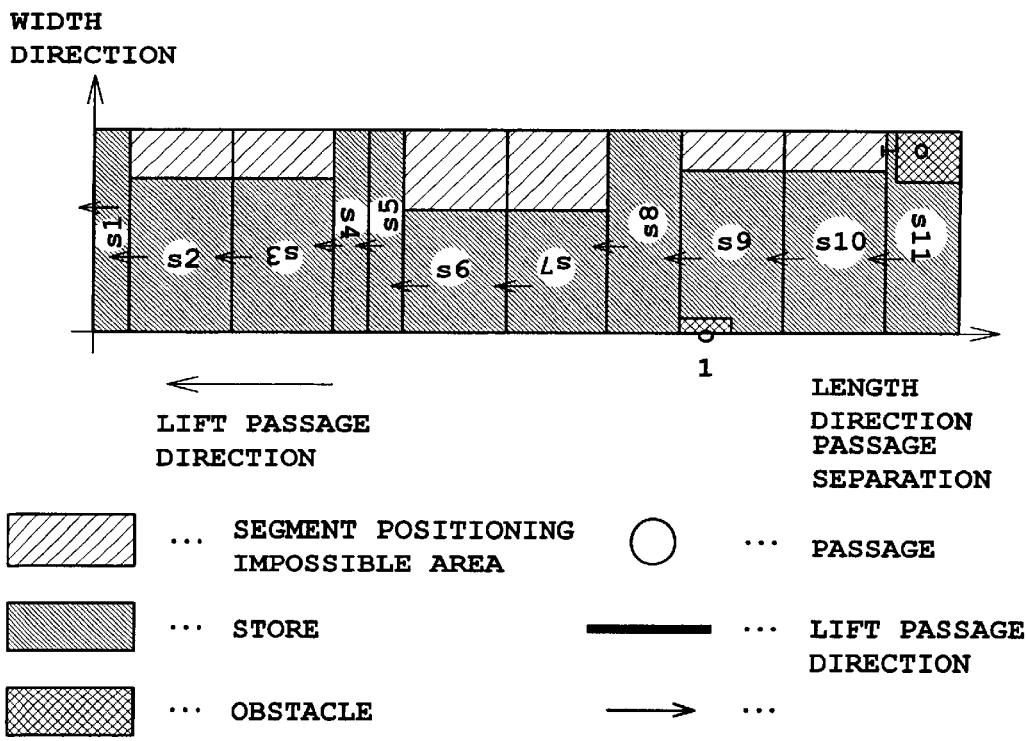

FIGS. 4A and 4B show a result of conversion from a parts storage shown in a representative coordinate system (FIG. 4A) to the parts storage shown in a plan coordinate system (FIG. 4B). As described above, a lift transporting the pallets through the passage turns to the vertical direction with regard to the passage direction and then enters the store so as to place parts. At this point, the orientation of placement of pallets in a store corresponds to the passage direction of the lift within the store. In other words, pallets are placed along a line which overlaps the passage direction of the lift. However, when parts placement calculation is performed on the representative coordinate system of the parts storage corresponding to a real plane as shown in FIG. 2 using the positional relationship of the passages, the stores and the obstacles as they are actually placed, the lift passage direction is diverted into four directions, namely upward, downward, left and right directions, in the representative coordinate system due to the positional relationship between the stores and the passages. As a result, placement calculation is complicated when parts placement is performed taking the lift passage direction into consideration. In order to avoid this problem, a plan coordinate system in which stores are rotated and moved such that the lift passage directions are oriented in one direction is adopted. Thus, by converting a representative coordinate system into the plan coordinate system as shown in FIG. 4B, it is possible to perform calculation with the lift-passage directions for all the stores being oriented in a predetermined direction.

Figure 5:
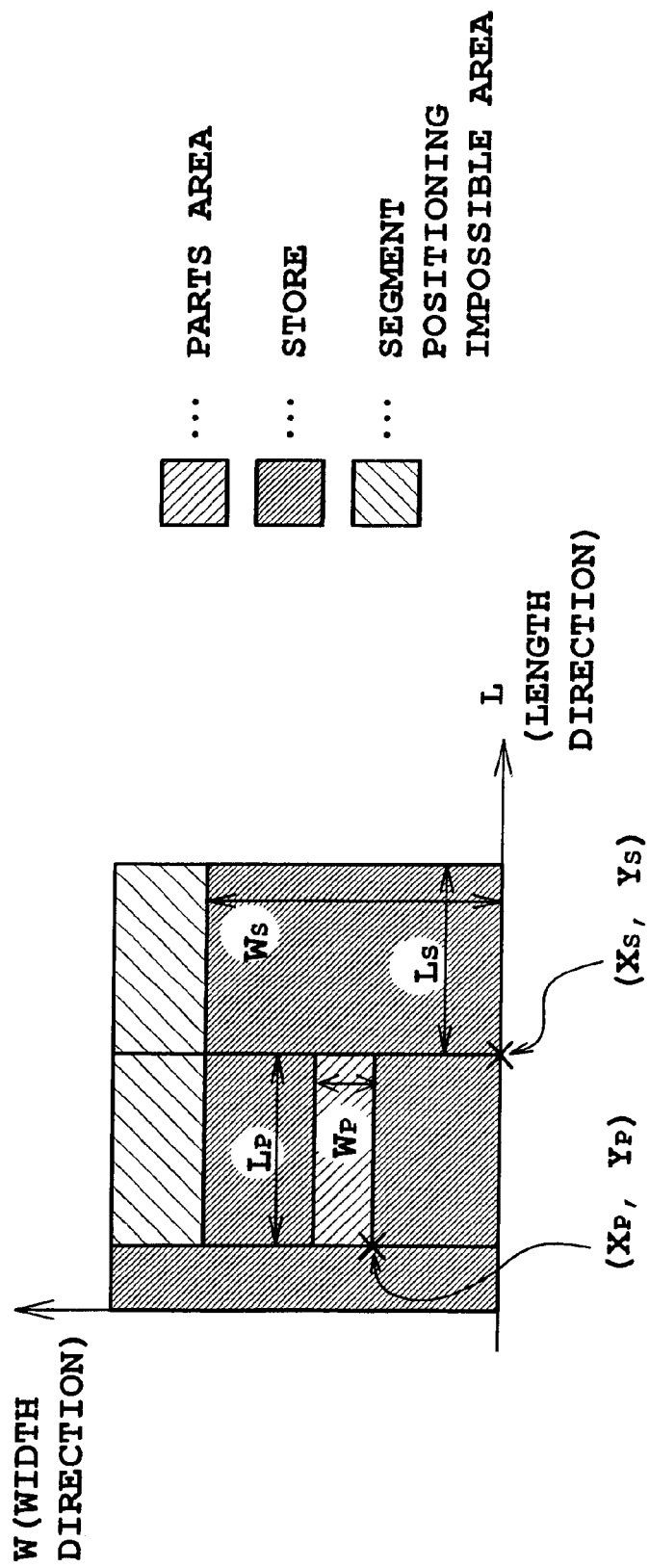
FIG. 5 is a view showing an example of setting of a parts area in a plan coordinate system.

FIG. 5 shows how a parts area determined in a store represented by the plan coordinate system. A parts area for the parts P is expressed in the plan coordinate system by coordinates (Xp, Yp) at the lower left of the parts area, the distance in the width direction Wp, and the distance in the length direction Lp. Here, the X direction, namely the length direction of the parts area, corresponds to direction of the placement line. Under the constraint condition that only the pallets loaded with the same type parts are placed in the same placement line, the length Lp of the parts area in the placement line direction is equal to the length Ls of the store in the placement line direction.

Accordingly, when the store Sp in which the parts P is to be placed is expressed by coordinates $(Xs_p, Ys_p)$ at the lower left of the store, the distance in the width direction $Ws_p$, and the distance in the length direction $Ls_p$, the relationship that $Lp=Ls_p$ and $Xp=Xs_p$ is established. More specifically, when the store Sp in which the parts P is to be placed is determined, unique values for Lp and Xp can be obtained. Further, the value of Wp can be obtained from the number of segments H necessary for placement of the parts P. More specifically, the number of necessary segments H is divided by the number of pallets to be placed in one placement line within the store, and when the quotient is an integral number, the integral quotient is determined as the number of lines of necessary segments whereas when the quotient is not an integral number, the integral parts of (quotient+1) is determined as the number of lines of necessary segments. The value of Wp is obtained by multiplying the number of lines of necessary segments with the segment width. Thus, all variances needed for parts placement can be obtained by determining only the store Sp and the location thereof (in the width direction) Yp.

At step S26 of FIG. 3, it is determined whether or not the selected parts can be placed in the store as described above. At this point, when it is determined the parts can be placed in the store, the store Sp is determined. At the subsequent step S28, by placing the parts in the store S, the value of Yp is determined. The value of Yp is determined such that the parts transportation distance is the shortest, for example. When the values of Sp and Yp are thus determined, parts placement can be performed.

In view of a plurality of types of pallets, because the pallet type is determined depending on the parts to be contained therein, the segment size is also determined by determining the parts and the pallet type. After the segment size is determined, the parts placement can be performed according to the flowchart shown in FIG. 3.

Further, with regard to a particular type of pallet, it is possible to provide vacant pallet storage line adjacent to a line of particular pallets. With such a configuration, when placing parts P contained in the particular type pallets, the value of Wp corresponding to the distance in the width direction regarding the parts P is determined by adding a width segments in one line to the value Wp calculated in the above-described method, and the parts placement can be performed according to the flowchart shown in FIG. 3 using the thus obtained value Wp.

It is also possible to increase the parts point value of parts for which a particular type of pallet is used by predetermined points. By allowing the arbitrary setting of increasing the parts point value of desired parts, it is possible to increase the priority when placing parts which uses the particular type of pallet.

It is also possible to establish store groups and designate a particular store group as stores which allow parts placement. In this case, at step S24 of the flowchart shown in FIG. 3, the list of placement possible stores is limited to stores in the designated store group, and a store with the highest store point value is selected from the designated store group.

Further, at step S21 of the flowchart shown in FIG. 3, only some subset of all parts may be selected and registered as target parts for placement, so that parts placement is performed for these registered parts according to the flowchart of FIG. 3. After completion of the placement, the parts which have been placed are fixed to the store. Then, the process returns to step S21 again, where the remaining parts which have not been placed are selected and registered as target parts for placement and the same procedure as described above is repeated. In this manner, parts placement can be performed step by step.

After a store in which the parts area is positioned is determined at step S26 of FIG. 3, parts are placed in the store at step S28. At this time, parts placement is performed such that the parts transportation distance becomes the shortest within the placement possible area. The parts placement within the store will be described below in further detail with reference to FIGS. 6 and 7.

Figure 9:
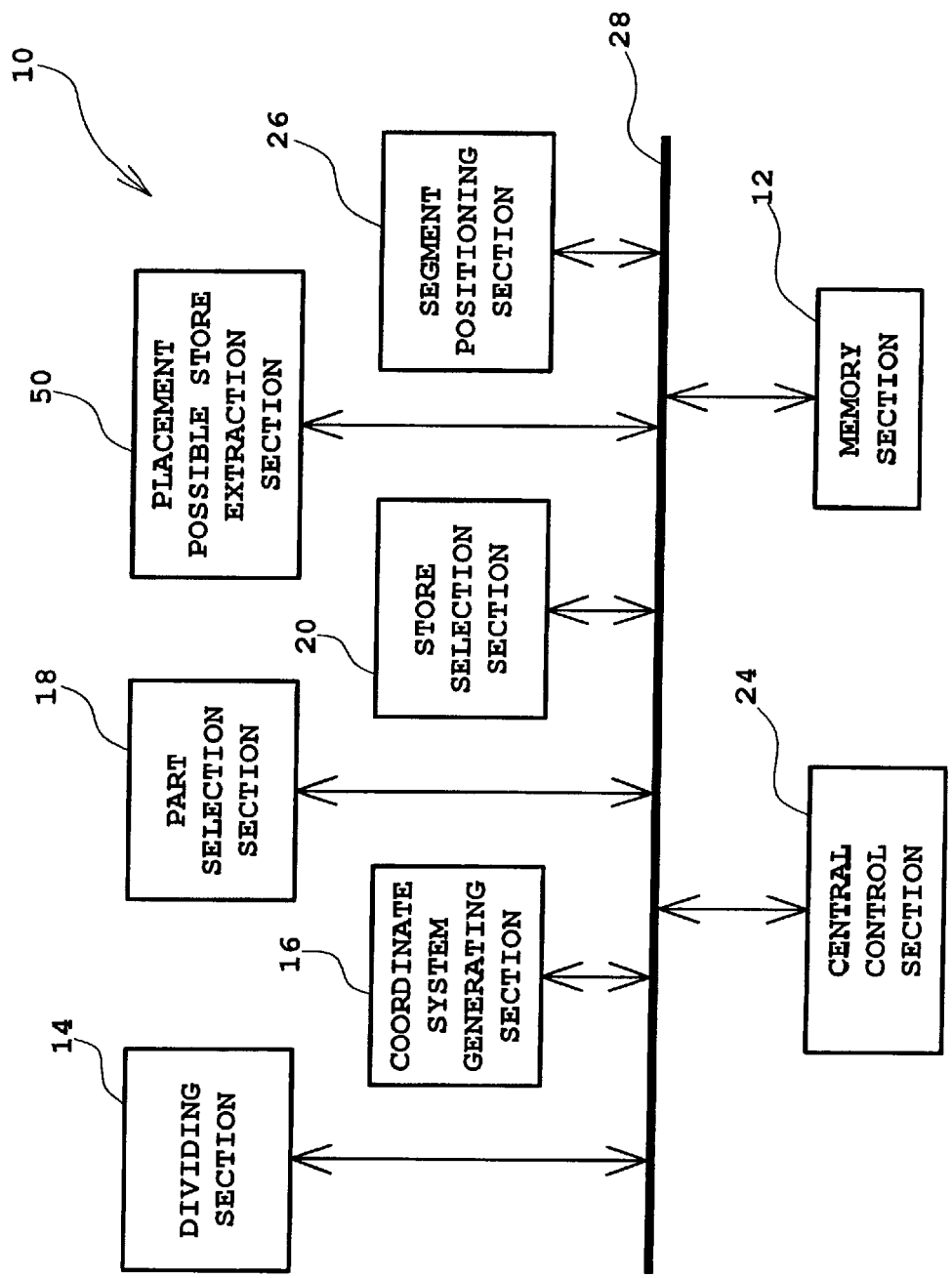
FIG. 9 is a block diagram of a parts placement calculation system according to another embodiment of the present invention.

FIG. 9 is a block diagram showing a whole configuration of a parts placement calculation system according to another preferred embodiment of the present invention. The parts placement calculation system shown in FIG. 9 comprises a placement possible store set extracting section 50 for excluding stores in which parts cannot be placed (hereinafter referred to as placement impossible stores) from the store list associated with each parts. Other components of the configuration including the dividing section 14, the coordinate system generating section 16, the parts selection section 18, the store selection section 20, the central calculation section 24, the segment positioning section 26, and the memory section 12 is the same as that of FIG. 1.

Figure 10:
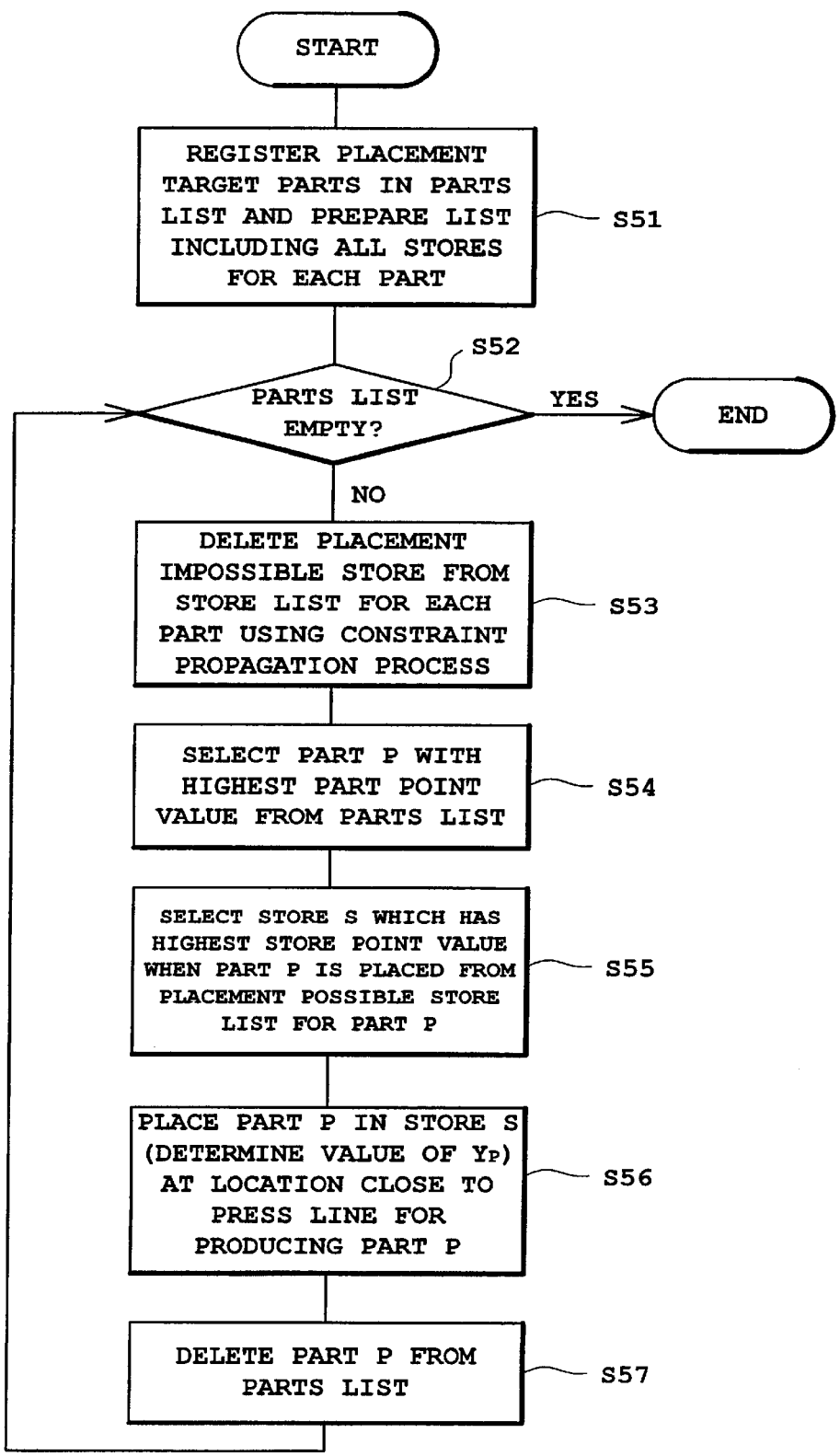
FIG. 10 is a flowchart showing a parts placing procedure according to another embodiment of the present invention.

FIG. 10 is a flowchart showing a parts placing procedure performed by the parts placement calculation system 10 shown in FIG. 9. The description will be given with reference to the flowchart.

At step S51, with regard to parts which must be placed, the number of segments required for placement, the parts point value, and the store point value are calculated and registered as a parts list.

At step S52, it is confirmed whether or not parts are registered in the parts list. When no parts are registered in the parts list, it is determined that placement of all the parts has been completed, and the parts placement is terminated. When parts are in the parts list, on the other hand, the process proceeds to step S53.

At step S53, a store in which parts cannot be placed (a placement impossible store) is removed from the store list associated with each parts. When a constraint logic programming, for example, is used as a method for deleting the placement impossible store based on a constraint condition to execute a constraint propagation process, it is possible to significantly reduce time for searching a solution.

At step S54, parts P with the highest parts point value is selected from the parts list.

At step S55, a store S which has the highest store point value when the parts P is placed is selected from the list of stores which allow placement of the parts P.

At step S56, the parts P is placed in the store S. At this time, the parts P is placed such that the parts transportation distance is the shortest in the placement possible area.

At step S57, the parts P is removed from the parts list and then process returns to step S52. The procedure for placing the parts in the selected store S is as described above.

Figure 6:
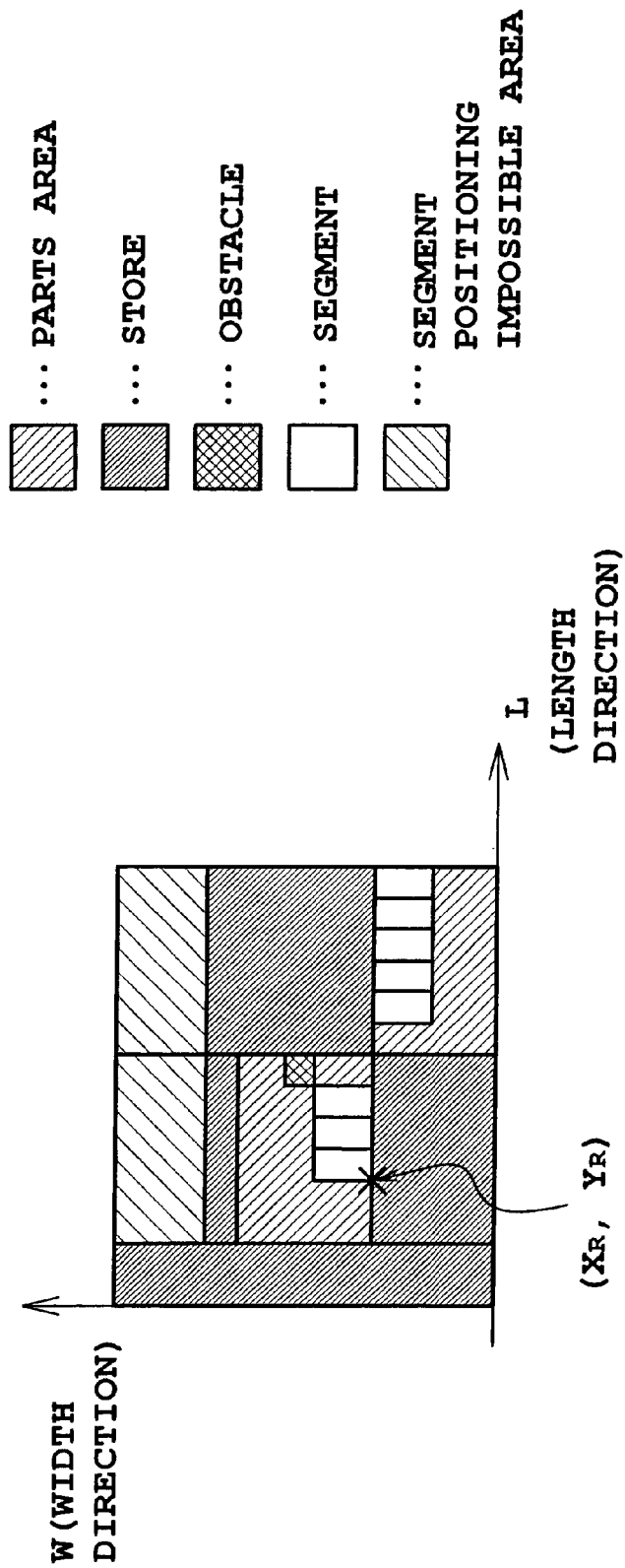
FIG. 6 is a view showing an example of positioning of a segment in a parts area.

FIG. 6 shows an example of positioning of a segment in a parts area. Because the parts area is already determined in the procedure shown in FIG. 3 or FIG. 10, positioning of segments can be determined corresponding to each parts.

In order to position the segments, it is desirable to use a plan coordinate system as described above. In FIG. 6, a vacant space corresponding to one line is provided adjacent to the line of segments within the parts area. This is therefore an example of pallet placement under a condition that a line of vacant pallet storage is provided next to the line of segments.

Here, it is assumed that the length direction of the store corresponds to the X direction and the width direction of the store corresponds to the Y direction. An arbitrary segment R regarding parts P is expressed by coordinates $(X_R, Y_R)$ at the lower left thereof, the width direction distance $W_R$, and the length direction distance $L_R$. Here, because the values of $W_R$ and $L_R$ are obtained by adding an extra distance to the pallet width and the pallet length regarding the parts P, respectively, variants to be determined are only $X_R$ and $Y_R$. Further, the value $X_R$ in the length direction ranges $Xp$~$Xp+Lp-L_R$, and the value $Y_R$ in the width direction ranges $Yp$~$Yp+WP-W_R$, wherein $Xp, Yp, Lp$, and $Wp$ are shown in FIG. 5.

Here the constraint condition for positioning of a segment is that the segment should not overlap segments already positioned or obstacles in the same store, or that, when a line of vacant pallet storage is provided next to the segment to be placed, the segment should not be positioned in the vacant pallet line.

Figure 7:
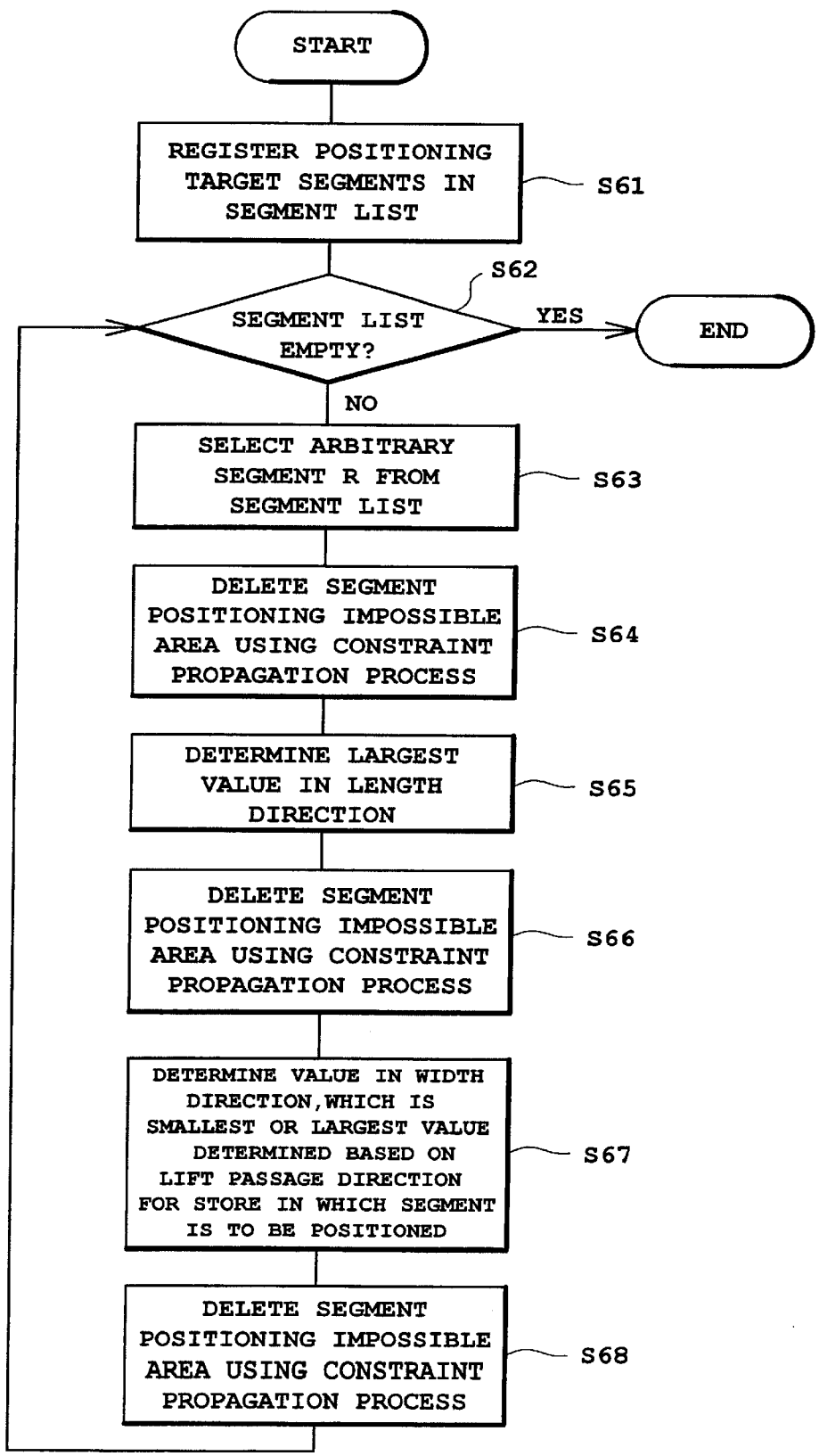
FIG. 7 is a flowchart showing a segment positioning procedure.

FIG. 7 is a flowchart showing a segment positioning procedure for positioning a segment in a parts area in the above-described situation.

At step S61, segments to be positioned in a parts area are numbered and registered in a segment list as positioning target segments.

At step S62, it is confirmed whether or not the segment list is empty. When no segments are registered in the segment list, it is determined that positioning of all the segments is complete, and segment positioning is terminated. When, on the other hand, one or more segments remain the segment list, the process proceeds to step S63.

At step S63, an arbitrary segment R is selected from the segment list.

At step S64, an area in which segment positioning is not possible (hereinafter referred to as a segment positioning impossible area) is deleted from the parts area based on a predetermined constraint condition, which may be, for example, that a segment to be positioned should not overlap any segments already positioned or any obstacles. When the above described constraint logical programming is used to perform a constraint propagation process as a method for deleting the segment positioning impossible area under the constraint condition, for example, it is possible to significantly reduce solution search time.

At step S65, Xr, which is the largest value in the length direction (X direction) within the positioning possible area, is determined.

At step S66, the segment positioning impossible area is deleted based on a predetermined constraint condition in the X direction.

At step S67, a value in the width direction (Y direction) is determined. In this case, a value $Y_R$ is determined as a smallest or largest value determined based on the lift passage direction of the store in which the segment is to be positioned. The above described example of FIG. 6 shows that $Y_R$ has the smallest value in the left store whereas $Y_R$ has the largest value in the right store. In either case, when expressed in the representative coordinate system, the segments are positioned starting from the furthest end of the parts area seen from the passage with no spaces between adjacent segments.

At step S68, after deleting an area where a segment cannot be positioned, the process returns to step S62.

By repeating the above steps until no positioning target segment is included in the segment list, all the positioning target segments are positioned in the parts area.

Figure 8:
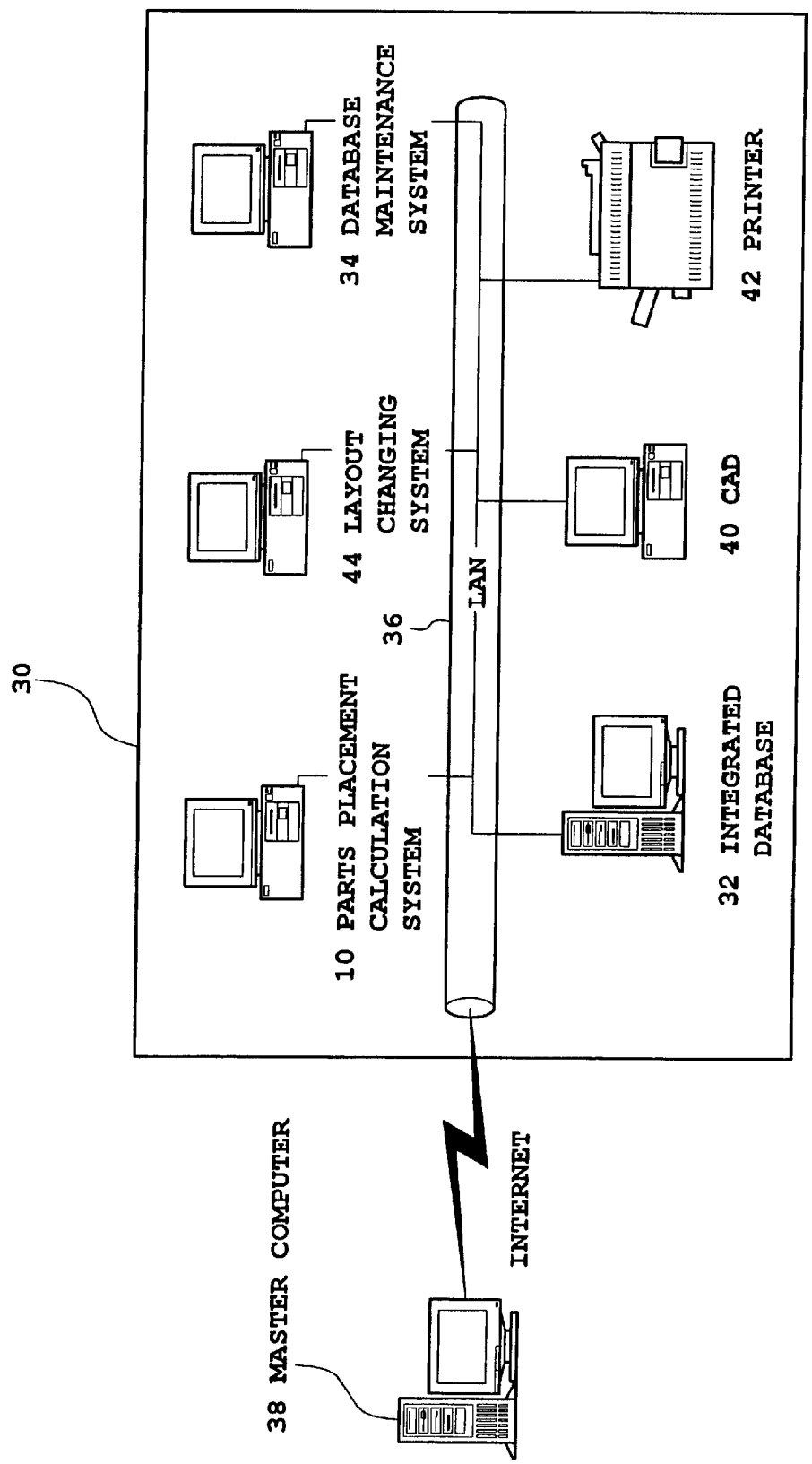
FIG. 8 is a view showing a configuration of a parts placement support system according to the present invention.

FIG. 8 is a view showing the overall configuration of a preferred embodiment of a parts placement support system which uses the above described parts placement calculation system.

As described above, in order to distribute and place parts of a plurality of types in a plurality of stores within a parts storage, the parts placement calculation system 10 places parts based on the parts point value which is set for each parts type and the store point value which is set for each store with regard to each type of parts.

An integrated database 32 controls the data required for parts placement, and a database maintenance system 34 performs addition, correction, and deletion of data with regard to the integrated database 32.

The systems shown in FIG. 8 are interconnected via a communication medium 36 such as LAN so as to perform mutual data transmission/reception. The communication medium is of course not limited to a LAN, and may be another type of wired communication system, or may be a wireless communication system.

The parts placement support system 30 is capable of data transmission/reception with regard to an external system or an operator via an interface section which is not shown. An example of the external system is a master computer 38 having various master information such as stock information, a parts number master, an equipment master, and a pallet master. It is desirable that the master computer 38 remotely located is connected with the parts placement support system 30 in a manner which allows communication via the Internet line, for example.

The information obtained from the master computer 38 includes information such as a production instruction of a product and the number of parts to be produced is generated from the product production instruction. The number of pallets used for actually performing parts placement is then calculated from the number of parts. This calculation may be performed by the master computer 38 or may be performed within the parts placement support system 30.

A change in each master information is stored in the integrated database 32, and the parts placement calculation system 10 is carried out based on the data stored in the integrated database 32. The result of the parts placement calculation is fine-tuned by an operator as necessary, and is then output to the integrated database 32. The placement calculation results may be fine-tuned by an operator by directly operating the parts placement calculation system 10. Alternatively, the placement calculation results may be corrected via a manual correction system for fine-tuning (not shown) which is capable of communicating with the present system.

The output result is captured into a CAD 40 and can be used for preparation of forms pertaining to parts placement. The results can also be printed and output by a printer 42.

When there is a change in the parts storage regarding the transportation route of the pallet, a vacant space, or the like, a layout changing system 44 retrieves layout information from the integrated database 32, corrects the information and then supplies the corrected data to the integrated database 32.

When data addition, correction and deletion is performed with respect to the data in the integrated database 32, the data maintenance system 34 reads the target data from the integrated database 32, changes the data, and then supplies the resultant data to the integrated database 32.

Naturally, all or parts of the systems within the parts placement support system 30 shown in FIG. 8 may be combined and implemented as one system, or that a part of each system may be implemented by software and executed by a computer.

As described above, the parts placement calculation system, the parts placement calculation method, the parts placement calculation program, a recording medium recording the parts placement calculation program, and the parts placement support system in accordance with the present invention can achieve parts placement design which takes into consideration physical distribution efficiency and area efficiency, even when a great number of types of parts are to be placed in a limited space.

While the preferred embodiments of the present invention have been described using specific terms, such description is for illustrative purposes only, and it is to be understood that changes and variations may be made without departing from the spirit or scope of the appended claims.

What is claimed is:

1. A parts placement calculation system for distributing and placing parts of a plurality of types in a plurality of stores within a parts storage based on a parts point value for each type of parts and a store point value for each store with regard to each type of parts, the system comprising:

parts selection means for selecting the parts with the highest parts point value from a list of parts to be placed;

store selection means for selecting the store with the highest store point value from a list of placement possible stores regarding the selected parts; and placement determination means for determining whether or not the selected parts can be placed in the selected store, based on a predetermined constraint condition for placing the selected parts in the selected store, wherein when the placement determination means determines that the selected parts cannot be placed in the selected store, the selected store is deleted from the list of placement possible stores and then the store selection means is activated again, and when the placement determination means determines that the selected parts can be placed in the selected store, a parts area for placing the selected parts in the store is determined, the selected parts is deleted from the list of parts to be placed, and the parts selection means is activated again.

2. A parts placement calculation system according to claim 1, wherein the constraint condition in the placement determination means is that selected parts do not overlap a parts area which is already positioned or an obstacle, and that an area sufficient for placing selected parts are provided.

3. A parts placement calculation system for distributing and placing parts of a plurality of types in a plurality of stores within a parts storage based on a parts point value for each type of parts and a store point value for each store with regard to each type of parts, the system comprising:

placement possible store set extraction means for removing a store in which placement is not possible based on a predetermined constraint condition for placing each parts from a store list associated with each parts;

parts selection means for selecting the parts with the highest parts point value from a list of parts to be placed; and store selection means for selecting the store with the highest store point value from a list of placement possible stores regarding the selected parts, wherein after the processing of the placement possible store set extraction means is executed, parts are selected by the parts selection means, a store for the selected parts is selected by the store selection means, and a parts area for placing the selected parts is determined in the selected store, and after the selected parts are deleted from the list of parts to be placed, the placement possible store set extraction means is executed again.

4. A parts placement calculation system according to claim 3, wherein the constraint condition in the placement possible store set extraction means is that selected parts do not overlap a parts area which is already positioned or an obstacle, and that an area sufficient for placing selected parts are provided, and also that when it is instructed to place a plurality of arbitrary parts in a same store, all of the plurality of arbitrary parts have an identical store list.

5. A parts placement calculation system according to claim 1, wherein the parts point value is obtained by adding a priority and an area difference of corresponding parts with a predetermined weighting coefficient multiplied therewith, the priority being a function of the frequency of provision and removal of the corresponding parts and the area difference being a function of a difference between the largest value and the smallest value of placing areas in stores for placing the corresponding parts, the placing areas being different for different stores as a result of their having a predetermined placing condition, and the store point value is obtained by adding a transportation distance point value and an area point value of a corresponding store with a predetermined weighting coefficient multiplied therewith, the transportation distance point value being a function of a transportation distance for transporting parts in and out of the corresponding store and the area point value being a function of a placing area which corresponds to a predetermined placing condition when placing parts in the corresponding store.

6. A parts placement calculation system according to claim 5, wherein the placing condition regarding the parts point value and the store point value is that only pallets containing the same type of parts are placed in the same pallet placement line which is in a lift traveling direction in the store, that pallet placement lines for the same types of parts are located adjacent to each other, and that pallets for the same type of parts are placed in the same store.

7. A parts placement calculation system according to claim 5, further comprising external input means for selecting a weighting coefficient of the parts point value and the store point value from a plurality of predetermined values and inputting the selected value.

8. A parts placement calculation system according to claim 1, further comprising dividing means for dividing an interior of the parts storage into a plurality of rectangular stores, passages extending in parallel to outer peripheries of each store, and obstacles;

parts of the same type being contained in the same pallet, and each pallet being transported by a lift, which, when traveling along the passages and reaches near the store, turns substantially the vertical direction with regard to a passage traveling direction and advances substantially straight to enter the store for transporting each pallet in and out; and coordinate system generating means for generating a plan coordinate system which is converted such that, when a lift traveling direction facing the passage within a store is a lift passage direction, a plurality of stores are rotated so that the lift passage directions thereof are oriented in a predetermined direction.

9. A parts placement calculation system according to claim 1, wherein parts to be placed are divided into a plurality of groups, from which a certain group is selected, and, after parts areas for placing all the parts included in the selected group are determined, the determined parts areas are fixed, and another group of the remaining groups is selected and parts areas for placing all the parts included in the selected group are determined, the above procedure being repeated.

10. A parts placement calculation system according to claim 8, further comprising:

segment positioning means for positioning, after determination of a parts area, a segment having a size corresponding to the pallet size with an extra space and provided corresponding to each pallet within the parts area, wherein the segment positioning means selects an arbitrary segment from a list of segments to be positioned within the parts area, and positions the selected segment at the furthest point from the passage of a positioning possible portion that is not occupied by a segment already positioned or an obstacle, along an arbitrary one line in which a segment can be positioned, and the selected segment is deleted from the list of segments and the above procedure is repeated after another arbitrary segment has been selected from the list of segments.

11. A parts placement calculation method for distributing and placing parts of a plurality of types in a plurality of stores within a parts storage based on a parts point value set for each type of parts and a store point value set for each store with regard to each type of parts, the method comprising:

a step in which parts selection means selects the parts with the highest parts point value from a list of parts to be placed;

a step in which store selection means selects the store with the highest store point value from a list of placement possible stores regarding the selected parts; and a step in which placement determination means determines whether or not the selected parts can be placed in the selected store, based on a predetermined constraint condition for placing the selected parts in the selected store, wherein when the placement determination means determines that the selected parts cannot be placed in the selected store, the selected store is deleted from the list of placement possible stores and then the store selection means is activated again, and when the placement determination means determines that the selected parts can be placed in the selected store, a parts area for placing the selected parts in the store is determined, the selected parts are deleted from the list of parts to be placed, and then the parts selection means is activated again.

12. A parts placement calculation method according to claim 11, wherein the constraint condition in the placement determination means is that a selected parts do not overlap a parts area which is already positioned or an obstacle, and that an area sufficient for placing selected parts are provided.

13. A parts placement calculation method for distributing and placing parts of a plurality of types in a plurality of stores within a parts storage based on a parts point value set for each type of parts and a store point value set for each store with regard to each type of parts, the method comprising:

a step in which placement possible store set extraction means removes a store in which placement is not possible based on a predetermined constraint condition for placing each parts from a store list associated with each parts;

a step in which parts selection means selects the parts with the highest parts point value from a list of parts to be placed; and a step in which store selection means selects the store with the highest store point value from a list of placement possible stores regarding the selected parts, wherein after the process in the placement possible store set extraction means is executed, parts are selected by the parts selection means, a store for the selected parts is selected by the store selection means, and a parts area for placing the selected parts is determined in the selected store, and after the selected parts are deleted from the list of parts to be placed, the placement possible store set extraction means is executed again.

14. A parts placement calculation method according to claim 13, wherein the constraint condition in the placement possible store set extraction means is that selected parts do not overlap a parts area which is already positioned and an obstacle, and that an area sufficient for placing selected parts are provided, and also that when it is instructed to place a plurality of arbitrary parts in a same store, all of the plurality of arbitrary parts must have an identical store list.

15. A parts placement calculation method according to claim 11, wherein the parts point value is obtained by adding a priority and an area difference of corresponding parts with a predetermined weighting coefficient multiplied therewith, the priority being a function of the frequency of provision and removal of the corresponding parts, and the area difference being a function of a difference between the largest value and the smallest value of placing areas in stores for placing the corresponding parts, the placing areas being different for different stores due to a predetermined placing condition, and the store point value is obtained by adding a transportation distance point value and an area point value of a corresponding store with a predetermined weighting coefficient multiplied therewith, the transportation distance point value being a function of a transportation distance for transporting parts in and out of the corresponding store and the area point value being a function of a placing area which depends on a predetermined placing condition when placing parts in the corresponding store.

16. A parts placement calculation method according to claim 15, wherein the placing condition regarding the parts point value and the store point value is that only pallets containing the same types of parts are placed in the same pallet placement line which is in the lift traveling direction in the store, that pallet placement lines for the same type of parts are located adjacent to each other, and that pallets for the same type of parts are placed in the same store.

17. A parts placement calculation method according to claim 15, further comprising a step in which an external input means selects a weighting coefficient of the parts point value and the store point value from a plurality of predetermined values and inputs the selected value.

18. A parts placement calculation method according to claim 11, further comprising:

a step in which dividing means divides an interior of the parts storage into a plurality of rectangular stores, passages extending in parallel to outer peripheries of each store, and obstacles, parts of the same type being contained in the same pallet, and each pallet being transported by a lift, which, when traveling along the passages and reaching a point near the store, turns substantially the vertical direction with regard to a passage traveling direction and advances substantially straight to enter the store for transporting each pallet in and out, and a step in which coordinate system generating means generates a plan coordinate system which is converted such that, when a lift traveling direction facing the passage within a store is a lift passage direction, a plurality of stores are rotated so that the lift passage directions thereof are oriented in a predetermined direction.

19. A parts placement calculation method according to claim 11, wherein parts to be placed are divided into a plurality of groups, from which a certain group is selected, and, after determination of parts areas for placing all the parts included in the selected group, the determined parts areas are fixed, and another group of the remaining groups is selected and parts areas for placing all the parts included in the selected group are determined, the above procedure being repeated.

20. A parts placement calculation method according to claim 18, further comprising:

a step in which segment positioning means, after determination of a parts area, positions a segment having a size corresponding to the pallet size with an extra space and provided corresponding to each pallet, within the parts area, wherein the segment positioning means selects an arbitrary segment from a list of segments to be positioned within the parts area, and positions the selected segment at the point of a positioning possible portion furthest from the passages at which a segment or an obstacle is not positioned, along an arbitrary one line in which a segment can be positioned, and the selected segment is deleted from the list of segments and the above procedure is repeated after selecting another arbitrary segment from the list of segments.

21. A parts placement calculation program which causes a computer to carry out parts placement calculation for distributing and placing parts of a plurality of types in a plurality of stores within a parts storage based on a parts point value set for each type of parts and a store point value set for each store with regard to each type of parts, the parts placement calculation program causing the computer to function as:

parts selection means for selecting the parts with the highest parts point value from a list of parts to be placed;

store selection means for selecting the store with the highest store point value from a list of placement possible stores regarding the selected parts; and placement determination means for determining whether or not the selected parts can be placed in the selected store, based on a predetermined constraint condition for placing the selected parts in the selected store, wherein when the placement determination means determines that the selected parts cannot be placed in the selected store, the selected store is deleted from the list of placement possible stores and then the store selection means is activated again, and when the placement determination means determines that the selected parts can be placed in the selected store, a parts area for placing the selected parts in the store is determined, the selected parts are deleted from the list of parts to be placed, and then the parts selection means is activated again.

22. A parts placement calculation program according to claim 21, wherein the constraint condition in the placement determination means is that selected parts do not overlap a parts area which is already positioned or an obstacle, and that an area sufficient for placing selected parts are provided.

23. A parts placement calculation program which causes a computer to carry out a parts placement calculation for distributing and placing parts of a plurality of types in a plurality of stores within a parts storage based on a parts point value set for each type of parts and a store point value set for each store with regard to each type of parts, the parts placement calculation program causing the computer to function as:

placement possible store set extraction means for removing a store in which placement is not possible based on a predetermined constraint condition for placing each parts from a store list associated with each parts;

parts selection means for selecting parts with the highest parts point value from a list of parts to be placed; and store selection means for selecting a store with the highest store point value from a list of placement possible stores regarding the selected parts, wherein after the placement possible store set extraction means is executed, parts are selected by the parts selection means, a store for the selected parts is selected by the store selection means, and a parts area for placing the selected parts is determined in the selected store, and after the selected parts are deleted from the list of parts to be placed, the placement possible store set extraction means is executed again.

24. A parts placement calculation program according to claim 23, wherein the constraint condition in the placement possible store set extraction means is that selected parts do not overlap a parts area which is already positioned and an obstacle, and that an area sufficient for placing selected parts are provided, and also that when it is instructed to place a plurality of arbitrary parts in a same store, all of the plurality of arbitrary parts must have an identical store list.

25. A parts placement calculation program according to claim 21, wherein the parts point value is obtained by adding a priority and an area difference of corresponding parts with a predetermined weighting coefficient multiplied therewith, the priority being a function of the frequency of transportation of the corresponding parts in and out, and the area difference being a function of a difference between the largest value and the smallest value of placing areas in stores for placing the corresponding parts, the placing areas being different for different stores due to a predetermined placing condition, and the store point value is obtained by adding a transportation distance point value and an area point value of a corresponding store with a predetermined weighting coefficient multiplied therewith, the transportation distance point value being a function of a transportation distance for carrying parts in and out of the corresponding store and the area point value being a function of a placing area which depends on a predetermined placing condition when placing parts in the corresponding store.

26. A parts placement calculation program according to claim 25, wherein the placing condition regarding the parts point value and the store point value is that only pallets containing the same types of parts are placed in the same pallet placement line which is in the lift traveling direction in the store, that pallet placement lines for the same types of parts are located adjacent to each other, and that pallets for the same type of parts are placed in the same store.

27. A parts placement calculation program according to claim 25 further causing a computer to function as external input means for selecting a weighting coefficient of the parts point value and the store point value from a plurality of predetermined values and inputs the selected value.

28. A parts placement calculation program according to claim 21, wherein the parts placement calculation program further causes a computer to function as dividing means for dividing an interior of the parts storage into a plurality of rectangular stores, passages extending in parallel to outer peripheries of each store, and an obstacle, parts of the same type are contained in the same pallet, and each pallet is transported by a lift, which, when traveling along the passages and reaches a location near the store, turns to substantially the vertical direction with regard to a passage traveling direction and advances substantially straight to enter the store for carrying each pallet in and out, and the parts placement calculation program further causes a computer to function as coordinate system generating means for generating a plan coordinate system which is converted such that, when a lift traveling direction facing the passage within a store is a lift passage direction, a plurality of stores are rotated so that the lift passage directions thereof are oriented in a predetermined direction.

29. A parts placement calculation program according to claim 21, wherein parts to be placed are divided into a plurality of groups, from which a certain group is selected, and after determining a parts area for placing all the parts included in the selected group, the determined parts areas are fixed, and another group of the remaining groups is selected and a parts areas for placing all the parts included in the selected group is determined, the above procedure being repeated.

30. A parts placement calculation program according to claim 28, which further causes a computer to function as segment positioning means for, after determination of a parts area, positioning a segment having a size corresponding to the pallet size with an extra space and provided corresponding to each pallet, within the parts area, wherein the segment positioning means selects an arbitrary segment from a list of segments to be positioned within the parts area, and positions the selected segment at the point of a positioning possible portion furthest from the passages on which no segment or obstacle is positioned, along an arbitrary one line in which a segment can be positioned, and the selected segment is deleted from the list of segments and the above procedure is repeated after selecting another arbitrary segment from the list of segments.

31. A computer readable recording medium in which a parts placement calculation program according to claim 21 is recorded.

32. A parts placement support system including the parts placement calculation system according to claim 1, the parts placement support system comprising:

an integrated database for managing data related to parts placement; and a layout changing system for retrieving layout information from the integrated database and outputting the layout information after the layout information has been corrected, when the layout within a parts storage is changed, wherein the parts placement calculation system performs parts placement calculation based on the data managed by the integrated database.

* * * * *